United States Patent [19]
Kirkham

[11] 3,786,938
[45] Jan. 22, 1974

[54] REVERSING DRIVE FOR A TOOL CHANGER

[75] Inventor: Edward E. Kirkham, Brookfield, Wis.

[73] Assignee: Kearney & Trecker Corporation, West Allis, Wis.

[22] Filed: May 22, 1972

[21] Appl. No.: 255,716

[52] U.S. Cl. .................. 214/1 BD, 29/568, 74/29, 74/109, 74/422
[51] Int. Cl. ............................................. B23q 3/157
[58] Field of Search..... 214/1 BD; 29/568; 74/109, 74/29, 422

[56] References Cited
FOREIGN PATENTS OR APPLICATIONS
| | | | |
|---|---|---|---|
| 4,743,273 | 11/1972 | Japan | 214/1 BD |
| 412,029 | 9/1945 | Italy | 74/29 |

Primary Examiner—Gerald M. Forlenza
Assistant Examiner—George F. Abraham
Attorney, Agent, or Firm—Cyril M. Hajewski

[57] ABSTRACT

The present invention relates to an improved reversing drive for a tool change mechanism. The improved novel features of this reversing drive are particularly disposed to be incorporated in a tool changer equipped with a pair of tool change arms mounted for pivotal movement in opposite direction from a parked position into enclosed gripping engagement with a pair of spaced apart tools. In addition, the described tool changer particularly adapted to receive the present reversing drive has already included separate power means connected to positively maintain the pivotal arms in original clamped engagement as well as effect bodily movement of the clamped arms to interchange the tools. The reversing drive of this invention includes a single unitary rack having inwardly facing opposed upper and lower rack sections laterally offset a sufficient distance to rotatably drive adjacently journalled gears in opposite direction upon rectilinear movement of the unitary rack in one direction. In addition, one of the laterally offset rack sections of the present invention incorporates an axially extending rack section that is relatively positionable to function as a transfer device for simultaneously engaging the synchronized teeth of both oppositely rotated concentric gears to maintain them in preset angular positions during axial movement relative thereto.

3 Claims, 2 Drawing Figures

PATENTED JAN 22 1974 3,786,938

3,786,938

REVERSING DRIVE FOR A TOOL CHANGER

BACKGROUND OF THE INVENTION

The arrangement for providing two separate drives for first rotating a pair of pivotal tool change arms in reverse directions to effect tool clamping, and second, moving both clamped arms in the same direction to bodily interchange the positions of the clamped tools is shown for the first time in a co-pending patent application. As there shown, a pair of pivotal tool change arms are initially rotated in opposite directions from parked to tool enclosing clamped positions. After this, the clamped arms are moved axially outward to extract the clamped tools and then rotated 180° in the same direction to interchange the positions of the clamped tools. Reverse input control of the reversibly journalled tool engaging arms is provided by concentrically and remotely journalled gears respectively interconnected to drive the arms by axially extending concentric drive sleeves. The unitary rack of the present reversing drive further consolidates and simplifies the transmission means for supplying input power to reversibly drive a pair of pivotal arms in opposite directions.

SUMMARY OF THE INVENTION

According to this invention, there is provided an improved and simplified transmission for simultaneously rotating adjacently journalled gears in reverse directions. Essentially, the drive comprises a unitary and rectilinearly movable rack configured to present laterally adjacent, inwardly facing upper and lower opposed rack sections that respectively engage the opposite outer peripheral edges of the adjacent gears. By means of this arrangement, rectilinear transverse movement of the unitary rack in one direction simultaneously rotates the respective adjacently journalled gears in opposite directions. Furthermore, the unitary rack is adapted to be positively locked against rectilinear movement to position the axially elongated teeth of one rack section for intermeshing with the oppositely rotatable gear as the teeth of that gear are moved axially in synchronized relationship with the already engaged gear being moved in like axial direction.

It is a general object of the present invention to provide a greatly improved reverse drive for rotatably driving adjacent gears in opposite directions.

It is another object of the invention to provide an improved unitary rack having laterally adjacent, and vertically spaced opposed rack sections so configured as to rotate adjacently journalled gears in opposite directions, and having one axially extending rack section relatively positionable in an axial direction to simultaneously engage the rotatably synchronized teeth of both gears.

It is a further object of the invention to provide an improved unitary reversing drive for rotating adjacent pivotal tool change arms in opposite directions from a parked position into clamped engagement with spaced apart tools.

DESCRIPTION OF THE PREFERRED EMBODIMENTS

Figure 1:
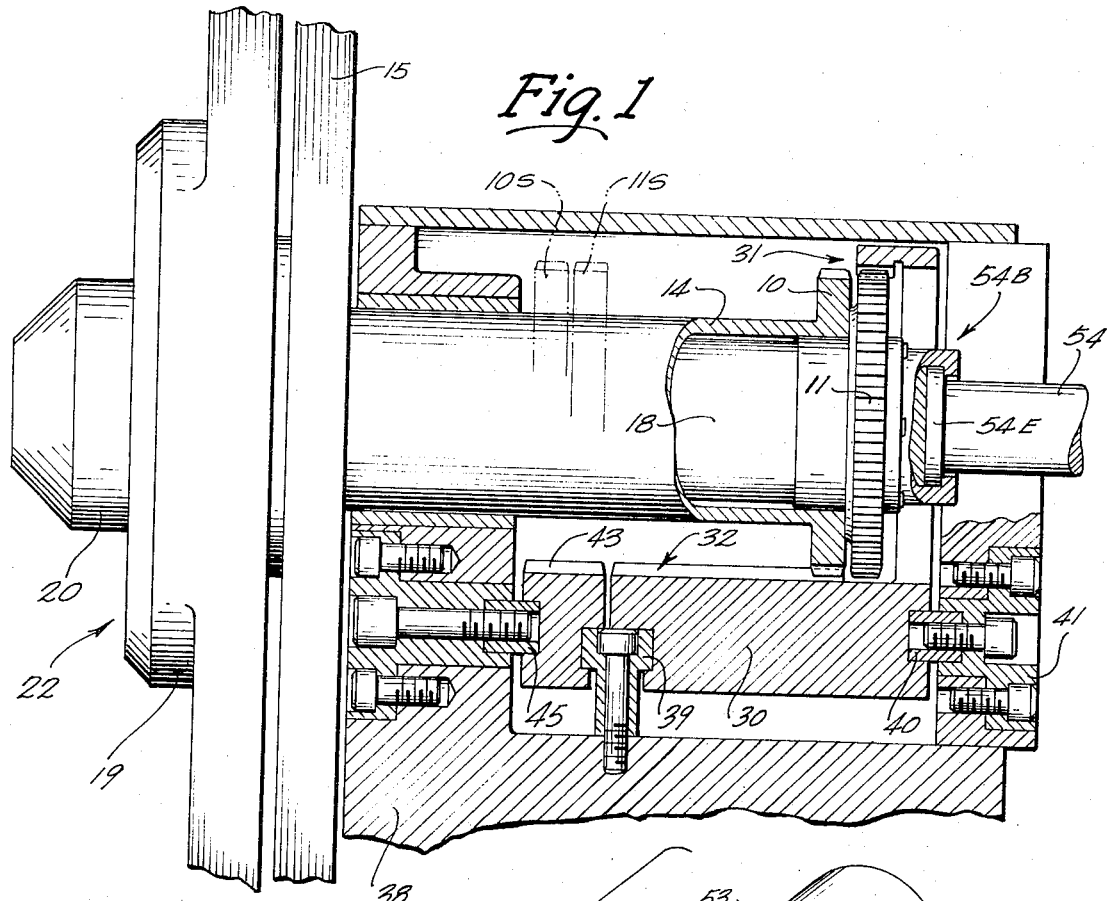
FIG. 1 is an enlarged fragmentary view, partly in elevation and partly in horizontal section through a drive mechanism incorporating the invention.
Figure 2:
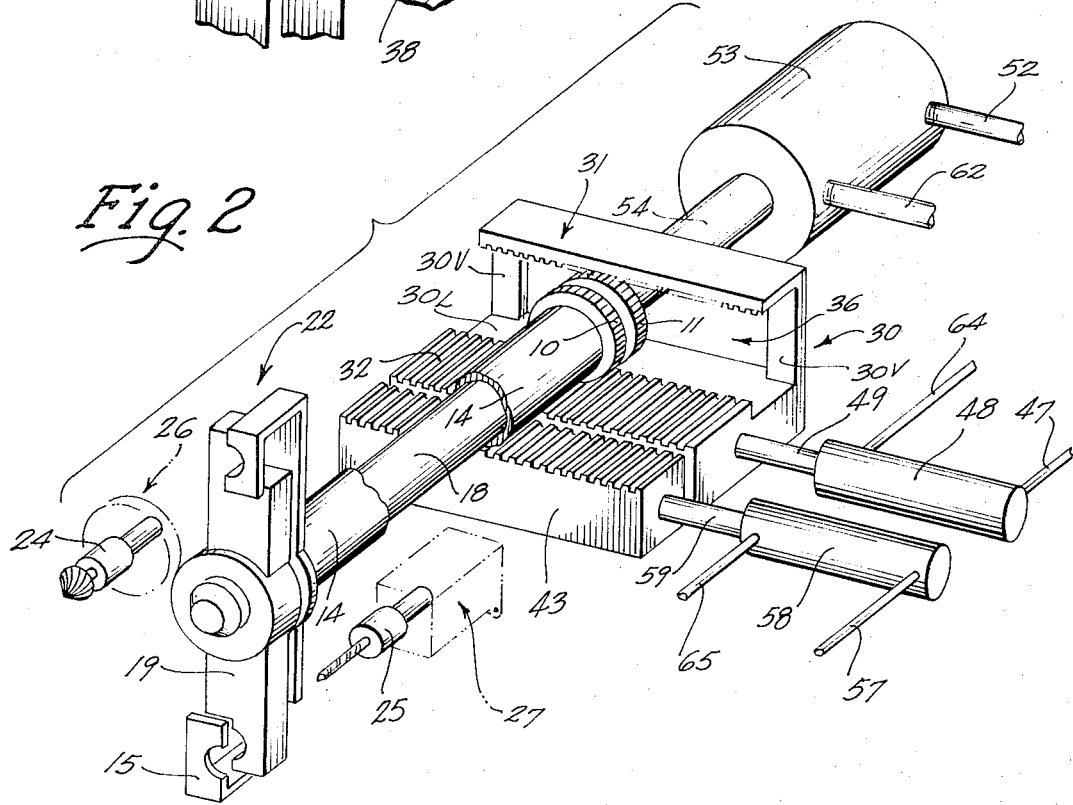
FIG. 2 is an enlarged fragmentary view in perspective of the applicant's invention and with parts broken away to clearly illustrate the unitary reverse drive means.

Referring now to the drawings and particularly to FIGS. 1 and 2 thereof, an improved reverse control drive mechanism is there illustrated as providing reversible input power to the oppositely rotatable tool change arms of a mchine tool. To receive driving power for being selectively rotated in opposite directions or connected for simultaneous rotation in the same direction, there are provided concentric and independently rotatable gears 10 and 11. The forward concentric gear 10 is positively secured to an outer tubular drive sleeve 14 that in turn is secured at its forward end to a rearwardly positioned large diameter tool change arm 15. The arrangement is such that rotation of the forwardly positioned gear 10 in either a clockwise or counterclockwise direction effects rotation of the outer tubular sleeve 14 and tool change arm 15 as a single unit in a corresponding clockwise or counterclockwise direction.

In a similar manner, a rearwardly adjacent and concentricallly formed drive gear 11 is positively secured to a forwardly extending concentrically formed drive shaft 18 that in turn is positively splined at its forward end to a forwardly positioned, smaller diameter tool changer arm 19. A forwardly positioned hub 20 is secured to the forwardly extending inner drive shaft 18 in a manner to maintain the respective tool change arms 19 and 15 in adjacent concentric positions for selective reverse rotation in opposite directions, or simultaneous rotation in the same direction.

Actually, the independently rotatable tool change arms or grips 15 and 19 comprise a single tool change mechanism 22 operative to effect a bodily interchange of a pair of spaced apart tools, such as 24 and 25, respectively carried in a horizontally spaced apart operating spindle 26 and a storage spindle 27. The spaced apart spindles 26 and 27 are movable from prior positions to the exact horizontally spaced apart positions shown in well-known manner at the atart of any tool changing operating cycle. To grasp tools for effecting an interchange, the separate independently journalled tool change arms 15 and 19 are respectively provided at their opposite ends with cooperatively disposed semicircular openings. The arrangement is such that upon beginning a tool changing operation, the arms 15 and 19 are respectively and coordinately rotated 90° in reverse directions. Thus, the inner or small diameter forward arm 19 is rotated from vertical parked position a distance of 90° in a clockwise direction as viewed from the front of the machine. At the same time, the larger diameter outer arm 15 is rotated from vertical parked position a distance of 90° in a counterclockwise direction. As a result, the semicircular open-ings respectively provided at the opposite ends of the arms 19 and 15 are moved into horizontally opposed tool enclosing clamped engagement with the respective tools 24 and 25.

After the arms are rotated into 90° clamped engagement with the respective tools, the entire horizontally disposed assembly 22, including arms 19 and 15, is moved axially forward to fully extract both of the clamped tools 24 and 25 from the respectively spaced apart tool receiving stations or spindles 26 and 27. Next, with the tools then fully withdrawn from the respective stations, the entire assembly may be rotated 180° in a clockwise direction to reposition the clamped tools. Upon completion of this movement, retracted tool 25 is moved 180° into alignment with the spindle 26 for insertion therein, and the retracted tool 24 is moved 180° into alignment with the storage station 27 for insertion therein. After effecting 180° rotation of the entire forwardly moved tool changer assembly 22, the arrangement is such that the entire assembly is moved axially inward to reinsert the now interchanged tools. After this, the respectively clamped tool change arms 15 and 19 are each rotated 90° in reverse direction from their still clamped horizontal positions in a manner to return the arms to vertical parked position as illustrated in FIG. 2.

Although this entire double clamp arm gripping arrangement of the changer mechanism 22 has been described in considerable detail in the aforementioned co-pending patent application to Earl R. Lohneis, the present reverse drive mechanism is particularly adapted to provide an improved method of supplying selective reverse drive to the input driving mechanism as well as controlled clamped engagement during axial movement.

To reversibly drive concentrically journalled gears 10 and 11, there is provided a greatly improved transversely slidable unitary rack structure 30. Acutally, the lineally movable unitary rack structure 30 is provided with an upper lineal rack section 31 having downwardly extending rack teeth in meshing engagement with the teeth presented by a rearwardly journalled gear 11. The upper lineal rack section 31 is secured to a parallel and laterally offset, axially elongated rack section 32 by means of transversely spaced apart vertical wall sections 30V—30V respectively secured at their lower ends to a transverse wall 30L joined to the base of rack section 32. In effect, the downwardly facing teeth of upper rack section 31 are fixedly secured relative to the vertically spaced apart upwardly facing rack teeth of laterally offset rack 32 to provide one unitary rack structure 30 joined together to provide reverse input driving power to the spaced apart gears 10 and 11.

Attention is directed to the fact that the vertically extending walls 30V—30V of the unitary rack structure 30 are transversely spaced apart a sufficient distance to provide an enlarged transversely formed, rectangular opening 36 permitting passage of a reduced diameter piston rod 54 rotatably secured to the gear 11. To do this, the piston rod 54 is provided with a flanged end 54E rotatably journalled in a bearing 54B fixedly secured to the hub of gear 11. The associated supporting machine tool structure 38 is provided with a pair of transversely extending rectangular guides 39 and 40 adapted to slidably engage complimentary guideways presented at opposite sides of the unitary rack structure 30 in well-known manner. The rearward rectangular guideway 40 is secured to a transversely extending end wall 41 that, in turn, fixedly secured to the support structure 38 of the machine. An axially forward, parallel rack 43 for effecting simultaneous rotation of both gears 10 and 11 in the same direction is mounted for transversely slidable movement on rectangular guideways 45 and 39. Rectangular guideway 45 is secured to the frame structure 38 in a manner similar to the spaced apart rectangular guideway 39.

Initially, to effect 90° reverse rotation of the input drive gears 10 and 11 in opposite directions, a circuit is activated to direct pressure fluid to an inlet 47 of a hydraulic cylinder 48. This effects forward transverse movement of a piston rod 49 connected to move the unitary rack structure 32 to the predetermined limit of its movement in a transverse direction. Preferably, an adjustable positioning stop plug (not shown) is provided to predeterminately limit the forward rectilinear movement of the unitary rack structure 30. Forward transverse movement of the unitary rack structure 30 is adapted to effect corresponding movement of the spaced apart opposed rack sections 31 and 32 to respectively rotate gears 10 and 11 in opposite directions at a one-to-one ratio. The described rectilinear movement of unitary rack structure 30 is adapted to simultaneously effect movement of the separate tool change arms 19 and 15 in a clockwise and counterclockwise direction respectively. Upon arrival of the unitary rack structure 30 at its predetermined limit of transverse movement, a limit switch (not shown) is actuated to both maintain the cylinder 48 at its pressure-actuated limit of forward movement, and activate the hydraulic circuit to supply pressure fluid to an inlet cylinder 53.

Actuation of cylinder 53 as described effects axial forward movement of a piston rod 54 which is connected to effect coordinated axial forward movement of the now angularly clamped gears 10 and 11 as well as the associated tubular shafts 18 and 14 which are connected to the respective tool change arms 15 and 19. Thus, it will be apparent the tool change arms move axially outward in their now horizontally clamped position to extract the spaced apart tools 24 and 25 from the respective toolholder sockets.

As axial forward movement is effected, the angularly clamped gears 10 and 11 are both moved axially forward into meshing engagement with the axially extending teeth of parallel rack section 32. Thus, the axially extending or elongated teeth 32 of the unitary rack structure 30 now function as an axial guide to maintain both gears 10 and 11 in originally clamped and synchronized positions until they move into meshing engagement with the axially spaced apart, or 180° control rack 43. Upon arrival of the angularly clamped gears 10 and 11 in axially forward position indicated at 10S and 11S, pressure fluid is directed to an inlet 57 of cylinder 58. Actuation of the cylinder 58, as described, urges an associated piston rod 59 forward to effect corresponding transverse movement of the rack 43 to effect simultaneous rotation of the synchronized, clamped gears 10S and 11S a distance of 180° in the same direction to effect a corresponding 180° interchanged rotation of the axially extracted tools carried by the clamped tool change arms 15 and 19. During this 180° rotation, it will be understood that the respective gears 10 and 11 are continuously retained in originally clamped position as initially effected by transverse movement of the unitary rack structure 30.

With the axially extracted and angularly clamped tool change arms 15, 19 in 180° interchanged position relative to the sockets 26 and 27, axial inserting movement of the respectively interchanged tools can be effected by activating the hydraulic circuit to supply pressure fluid to inlet 62 of rearwardly positioned axial stationary cylinder 53. Inward movement of the still clamped changer arms 19 and 15 to reinsert the interchanged tools is effected by corresponding axial inward movement of the axially extending piston rod 54 due to the rotatable connection of piston rod flange 54E to the flanged bearing 54B secured to gear 11. During the axial inserting stroke of the entire clamped tool change assembly 22, the still clamped gears 10 and 11 are maintained in originally clamped position by engagement of the teeth presented by gears 10 and 11 with the axially elongated rotatably stationary meshing teeth of the transfer rack section 32. Upon arrival of the tool change assembly in its fully inserted position, the respectively associated clamped gears 10 and 11 are returned into the rearward axial positions illustrated in FIG. 1. As there shown, the rearward gear 11 connected to the inner tubular drive sleeve 18 is returned into meshing engagement with the upper rack section 31 of unitary rack structure 30. At the same time, the concentrically journalled drive gear 10 connected to drive the outer tubular sleeve 14 is still maintained in meshing engagement with the teeth of the parallel lower rack section 32 of the unitary rack structure 30. Inasmuch as the respective gears are now in reversible meshing engagement with the opposed, vertically spaced apart and laterally offset rack sections of the unitary rack structure 30, a condition has been re-established for returning the clamped tool change arms 19 and 15 from horizontal position to original vertically parked position. This condition is achieved by reactivating the hydraulic circuit to supply pressure fluid to a forward inlet 64 associated with the 90° cylinder 48. At the same time, pressure fluid is supplied to an inlet 65 of cylinder 58. Thus, hydraulic fluid supplied to inlets 64 and 65 effect rightward rearward movement of the respectively associated piston rods 49 and 59, thereby moving unitary rack structure 30 and 180° rack 43 to the limit of rightward movement. This returns both rack structures to rightward position facilitating a restarting of the next tool change cycle in the manner hereinbefore described.

Although not shown in the drawings, it will be understood that limit switches are connected to be actuated by movement of the respective rectilinearly movable members including piston rods 49, 54 and 59 in the usual manner. It will likewise be understood that in all cases, adjusting plugs (not shown) are coordinately preset to limit the axial movement of each of the axially movable racks and associated piston rods as required. In all cases likewise, the preset rectilinear adjustment of the adjusting plugs is coordinated with the operation of the associated limit switch for that particular axis.

Although the illustrative embodiments of this invention have been described in considerable detail for the purpose of disclosing a practical operating structure whereby the invention may be practiced advantageously, it is to be understood that the particular apparatus described is intended to be illustrative only and that the various novel characteristics of the invention may be incorporated in other structural forms without departing from the spirit and scope of the invention as defined in the subjoined claims.

What I claim is:

1. In a drive mechanism for driving a tool transfer member that comprises a pair of cooperating tool change arms with each having at least one grip;
   a first drive shaft rotatably supported by said frame and con-nected to rotate the first of said tool change arms;
   a first gear connected to rotate with said first drive shaft;
   a second drive shaft rotatably supported by said frame and con-nected to rotate the second of said tool change arms;
   a second gear connected to rotate said second drive shaft;
   a first gear rack in meshing engagement with said first gear;
   a second gear rack connected for movement in unison with said first gear rack and being in meshing engagement with said second gear in position so that the unitary movement of said gear racks will cause said first and second gears to rotate in opposite directions for rotating said tool change arms in opposite directions to move their cooperating grips either toward each other into engagement with a tool for securing the tool to said transfer member, or for moving said grips away from each other for releasing a tool;
   actuating means connected to actuate said gear racks in unison in either direction for producing the rotation of said first and second gears and their associated tool change arms;
   a third gear rack in alignment with said first gear rack;
   shifting means connected to shift said first and second gears in unison into simultaneous engagement with said third gear rack; and
   second actuating means connected to actuate said third gear rack in either direction for producing simultaneous rotation of said first and second gears in the same direction to produce a like simultaneous rotation of said tool change arms for transferring a gripped tool from one position to another.

2. A drive mechanism according to claim 1 including locking means preventing relative rotation of said first and second gears during the shifting movement toward and away from said third gear rack so that said tool change arms are locked in their positions with respect to each other to maintain a gripped tool secured to said tool change arms during the transfer movement.

3. A drive mechanism according to claim 2 wherein said locking means comprises elongated teeth on said first gear rack, and as said first and second gears are shifted toward said third gear rack, said first gear remains in meshing engagement with said elongated teeth and said second gear is moved into meshing engagement with said elongated teeth to lock said first and second gears together during the shifting movement.

* * * * *